(No Model.)
G. P. ROSS & P. VALLEJO.
Double Walled Glass Fish Globe.
No. 233,435.      Patented Oct. 19, 1880.
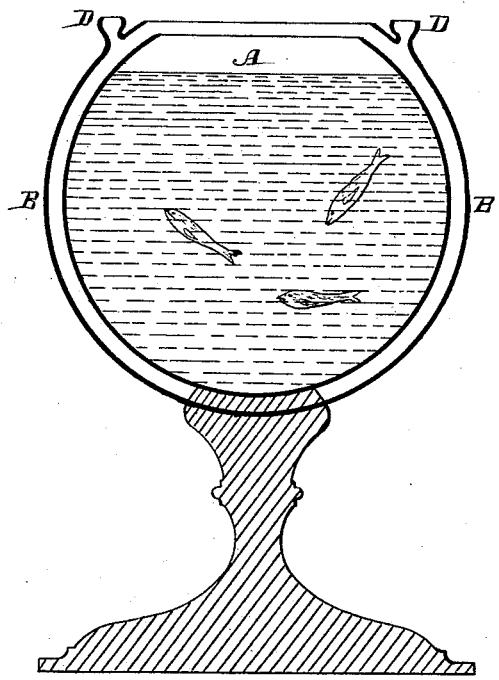
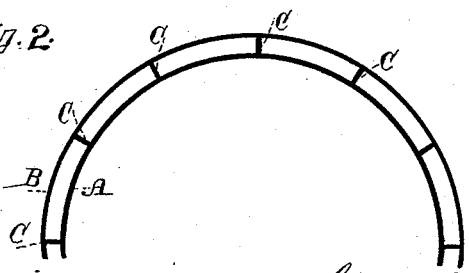
Witnesses
Geo. H. Strong.
Frank A. Brooks.
Inventors.
George P. Ross
Plutarco Vallejo
By Dewey & Co.
Attys

UNITED STATES PATENT OFFICE.

GEORGE P. ROSS AND PLUTARCO VALLEJO, OF BRISTOL, NEVADA.

DOUBLE-WALLED GLASS FISH-GLOBE.

SPECIFICATION forming part of Letters Patent No. 233,435, dated October 19, 1880.

Application filed July 20, 1880. (No model.)

*To all whom it may concern:*

Be it known that we, G. P. ROSS and PLUTARCO VALLEJO, of Bristol, county of Lincoln, and State of Nevada, have invented an Improved Double-Walled Glass Fish-Globe; and we hereby declare the following to be a full, clear, and exact description thereof.

Our invention relates to certain improvements in the construction of globes or transparent vessels which are intended to contain gold and other ornamental fish; and it consists of a doubled-walled chamber having an intervening space or spaces, within which various colored fluids may be placed, so as to give a peculiar or attractive appearance to the contents of the globe or vessel.

Referring to the accompanying drawings for a more complete explanation of our invention, Figure 1 is a view of a globe showing our invention. Fig. 2 is a section.

A is a globular or other shaped vessel adapted to be filled with water and to contain gold or other ornamental fish. Outside this globe we form a second inclosing-globe, B, which may be connected to or supported from the inner globe at any desired distance, from a half inch upward. In some cases this exterior space may be subdivided by vertical partitions C, so that differently-colored liquids may be placed in each compartment; or, if desired, the whole space surrounding the inner globe may be continuous, so that a single color will surround the interior compartment. At the top of this exterior compartment a nozzle or nozzles, D, are formed to receive the liquid which is to be introduced, and they may be made in any ornamental form desired.

By this construction the globes may receive any tint desired, either to correspond with or contrast with the tint of the room in which the fish are to be kept, and the fish or other contents of the globe or vessel will be tinged with the color used by being seen through it.

If vertical partitions are employed and a number of colors placed around the globe, the moving fish will take up the colors alternately through which they are seen.

Having thus described our invention, what we claim as new, and desire to secure by Letters Patent, is—

The improvement in fish-globes consisting of the surrounding exterior compartment or compartments adapted to receive one or more colored liquids, substantially as and for the purpose herein described.

In witness whereof we have hereunto set our hands.

GEORGE P. ROSS.
PLUTARCO VALLEJO.

Witnesses:
P. J. McINTYRE,
JOHN REYNOLDS.